United States Patent
Fujiwara et al.

(10) Patent No.: US 7,861,514 B2
(45) Date of Patent: Jan. 4, 2011

(54) METHOD AND DEVICE FOR DETECTING DETERIORATION OF CATALYST

(75) Inventors: Takahiko Fujiwara, Susono (JP); Yasuyuki Takama, Gotenba (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 879 days.

(21) Appl. No.: 11/583,726

(22) Filed: Oct. 20, 2006

(65) Prior Publication Data

US 2007/0089398 A1    Apr. 26, 2007

(30) Foreign Application Priority Data

Oct. 21, 2005    (JP)    ............... 2005-307409

(51) Int. Cl.
*F01N 3/00* (2006.01)
*F01N 3/10* (2006.01)

(52) U.S. Cl. ............... 60/277; 60/274; 60/276; 60/285; 60/299

(58) Field of Classification Search ............ 60/274, 60/277, 285, 301, 273, 276, 299

See application file for complete search history.

(56) References Cited

U.S. PATENT DOCUMENTS

2004/0006971 A1 * 1/2004 Kamoto et al. ............ 60/277

2005/0056266 A1 * 3/2005 Ikemoto et al. ............ 123/688

FOREIGN PATENT DOCUMENTS

| JP | 8-338231 A | 12/1996 |
| JP | A-10-212935 | 8/1998 |
| JP | A-2001-234784 | 8/2001 |
| JP | 2004-044450 A | 2/2004 |

* cited by examiner

*Primary Examiner*—Thomas E Denion
*Assistant Examiner*—Audrey Klasterka
(74) *Attorney, Agent, or Firm*—Kenyon & Kenyon LLP

(57) ABSTRACT

During deterioration detection of a catalyst, exhaust gas of a lean air/fuel ratio and exhaust gas of a rich air/fuel ratio are alternately supplied to the catalyst, and decrease of the $O_2$ storage function is detected by obtaining the oxygen occlusion amount in the catalyst, based upon the timing at which, after changeover of the air/fuel ratio of the exhaust gas flowing into the catalyst, the air/fuel ratio of the exhaust gas passed through the catalyst changes to track that air/fuel ratio of the exhaust gas flowing into the catalyst. At this time, the rich air/fuel ratio of the exhaust gas and the lean air/fuel ratio of the exhaust gas supplied to the catalyst are set closer to the stoichiometric air/fuel ratio, the larger is the exhaust flow amount.

13 Claims, 8 Drawing Sheets

METHOD AND DEVICE FOR DETECTING DETERIORATION OF CATALYST

INCORPORATION BY REFERENCE

The disclosure of Japanese Patent Application No. 2005-307409 filed on Oct. 21, 2005 including the specification, drawings and abstract is incorporated herein by reference in its entirety.

BACKGROUND OF THE INVENTION

1. Field of the Invention

The present invention relates to a method and a device for detecting deterioration of an exhaust purification catalyst.

2. Description of the Related Art

As a method of detecting the deterioration of an exhaust purification catalyst such as a three-way catalyst or the like, a method of employing the $O_2$ storage operation of the catalyst is per se known.

For example, if the air/fuel ratio of the exhaust which is flowing in a three-way catalysts is within a comparatively narrow range centered upon the stoichiometric air/fuel ratio, it is possible to purify all the three components NOx, HC, and CO within the exhaust. Due to this, with a three-way catalyst or the like, by carrying an oxygen storage component such as cerium (Ce) or the like upon the three-way catalyst, it is possible to enhance the exhaust purification efficiency by imparting an $O_2$ storage function to the catalyst.

An $O_2$ storage function is a function in which an oxygen storage component which is carried upon the catalyst occludes the surplus oxygen component in the exhaust gas when the air/fuel ratio of the exhaust gas which is flowing into the catalyst is leaner than the stoichiometric air/fuel ratio, while emitting the oxygen component which has thus been occluded into the exhaust gas when the exhaust air/fuel ratio is richer than the stoichiometric air/fuel ratio. Due to this O2 storage function it becomes possible, even if the air/fuel ratio of the exhaust which is flowing into the three-way catalyst fluctuates more or less from the stoichiometric air/fuel ratio, still to maintain the ambient atmosphere around the catalyst in the neighborhood of the stoichiometric air/fuel ratio, so that thereby it becomes possible to perform exhaust purification efficiently with the three-way catalyst.

Such an $O_2$ storage function decreases steadily along with deterioration of the catalyst. Due to this, it is possible to utilize the $O_2$ storage function as a parameter of deterioration of an exhaust purification catalyst. When the $O_2$ storage function decreases, the amount of oxygen which can be stored in the oxygen storage component decreases. Due to this, if the $O_2$ storage function is normal, even if for example a state, in which the air/fuel ratio of the exhaust gas flowing into the catalyst is deviated from the stoichiometric air/fuel ratio, is maintained for quite a long time period, nevertheless, since the catalyst is able to occlude a sufficient amount of the oxygen from within the exhaust gas, or is able to emit a sufficient amount of oxygen into the exhaust gas, accordingly it is possible for the ambient atmosphere around the catalyst to be maintained near the stoichiometric air/fuel ratio.

In other words, if the O2 storage function is normal, even if the air/fuel ratio of the exhaust gas which is flowing into the catalyst (i.e. the catalyst upstream side exhaust air/fuel ratio) fluctuates more or less from the stoichiometric air/fuel ratio, still the air/fuel ratio of the exhaust gas after it has passed through the catalyst (i.e. the catalyst downstream side exhaust air/fuel ratio) is maintained in the neighborhood of the stoichiometric air/fuel ratio, and does not fluctuate.

However since, when the O2 storage function decreases, the amount of oxygen which is occluded in the oxygen storage component of the catalyst, or the amount of oxygen which is emitted from the oxygen storage component, decreases even under the same conditions, accordingly, after a state in which the catalyst upstream side exhaust air/fuel ratio fluctuates from the stoichiometric air/fuel ratio has been maintained for a comparatively short time period, then the catalyst downstream side air/fuel ratio also comes to fluctuate, in the same manner as the catalyst upstream side air/fuel ratio.

In Japanese Patent Application Publication No. JP-A-10-212935, for example, there is disclosed a method of detecting decrease of the $O_2$ storage function of a catalyst, in other words deterioration of the catalyst, by detecting fluctuations of the air/fuel ratio on the downstream side of that catalyst. With this method of detecting deterioration of Japanese Patent Application Publication No. JP-A-10-212935, deterioration of the catalyst is detected based upon the ratio of the number of times, over a predetermined time period, that the catalyst upstream side exhaust air/fuel ratio changes between rich and lean (i.e. inverts), with respect to the number of times that the catalyst downstream side air/fuel ratio changes between rich and lean (i.e. inverts).

In, for example, the case in which the catalyst is not deteriorated (i.e. its $O_2$ storage function is not decreased), even if the number of times that the catalyst upstream side exhaust air/fuel ratio inverts between rich and lean is great, due to absorption and emission of oxygen into and from the catalyst, the catalyst downstream side exhaust air/fuel ratio does not change very much, so that the number of inversions between rich and lean of the exhaust air/fuel ratio on the downstream side of the catalyst is quite small. Due to this, the value of the ratio of the number of times that the catalyst upstream side exhaust air/fuel ratio inverts with respect to the number of times that the catalyst downstream side air/fuel ratio inverts is large.

On the other hand, if the catalyst has deteriorated (i.e. if its $O_2$ storage function has decreased), since the number of times that the catalyst downstream side exhaust air/fuel ratio inverts comes to approach the number of times that the catalyst upstream side exhaust air/fuel ratio inverts, accordingly the value of the above described ratio becomes small. In the invention of the abovementioned Japanese Patent Application Publication No. JP-A-10-212935, it is arranged to decide that the catalyst has deteriorated if the value of the above described ratio falls below a value which is determined in advance.

However, the above described number of inversions of the downstream side exhaust air/fuel ratio experiences a great influence, not only from the $O_2$ storage function of the catalyst, but also due to the amount of exhaust which is flowing through the catalyst. In other words, since the amount of oxygen absorbed or emitted per unit time for the exhaust air/fuel ratio to approach the stoichiometric air/fuel ratio must be greater when the exhaust flow amount is great as compared to when it is small, accordingly, as described hereinafter, the fluctuations of the catalyst downstream side exhaust air/fuel ratio can easily become great even if the $O_2$ storage function of the catalyst has not decreased, so that, even if the catalyst is still in its normal state, it may happen that an erroneous decision that the catalyst has deteriorated may still be arrived at.

It should be understood that while, in the abovementioned Japanese Patent Application Publication No. JP-A-10-212935, deterioration of the catalyst was decided upon using the ratio of the number of inversions of the air/fuel ratio between the upstream side and the downstream side of the catalyst, in any case, even if some other parameter than the number of inversions of the air/fuel ratio is employed, if the $O_2$ storage function is used as a parameter of deterioration of the catalyst, there is a problem that the decision as to deterioration of the catalyst may become inaccurate if the exhaust flow amount is large. In order to prevent this, in the above-mentioned Japanese Patent Application Publication No. JP-A-10-212935, the occurrence of mistaken decisions is prevented by not making a decision that the catalyst has deteriorated, if the exhaust flow amount is greater than a predetermined flow amount.

By, as in Japanese Patent Application Publication No. JP-A-10-212935 as described above, not making a decision that the catalyst has deteriorated if the exhaust flow amount is large, it is possible to prevent the mistaken decision that the catalyst has deteriorated when it is, in fact, normal.

However, if it is arranged not to make any decision at all as to deterioration of the catalyst if the exhaust flow amount is large, then, depending upon the pattern of operation of the engine, the opportunity for making a decision as to deterioration of the catalyst may be greatly decreased, and sometimes it may happen that no deterioration decision is made over a long period of time, irrespective of whether or not the catalyst has actually deteriorated, so that the problem arises that a catalyst which has deteriorated may remain in use.

SUMMARY OF THE INVENTION

The present invention provides a method and a device for detecting deterioration of an exhaust purification catalyst, which are capable of making a decision as to whether or not the catalyst has deteriorated with good accuracy, irrespective of the flow amount of the exhaust.

According to a first aspect of the present invention, there is provided a method for detecting deterioration of an exhaust purification catalyst, comprising steps of: alternately supplying exhaust gas of a lean air/fuel ratio and exhaust gas of a rich air/fuel ratio to the catalyst; bringing the air/fuel ratio of the lean air/fuel ratio exhaust gas and of the rich air/fuel ratio exhaust gas thus alternately supplied to the catalyst closer to the stoichiometric air/fuel ratio, when the exhaust gas flow amount supplied to the catalyst is great, as compared to when the exhaust gas flow amount supplied to the catalyst is small; and deciding upon the degree of deterioration of the catalyst, based upon at least one of the air/fuel ratio change time period from the initiation of supply of lean air/fuel ratio exhaust gas to the catalyst until the air/fuel ratio of the exhaust gas on the catalyst downstream side changes over to a lean air/fuel ratio, and the air/fuel ratio change time period from the initiation of supply of rich air/fuel ratio exhaust gas to the catalyst until the air/fuel ratio of the exhaust gas on the catalyst downstream side changes over to a rich air/fuel ratio.

Furthermore, according to a second aspect of the present invention, there is proposed a method for detecting deterioration of an exhaust purification catalyst in which, in the above described method for detecting catalyst deterioration according to the first aspect of the present invention, when deciding upon the degree of deterioration of the catalyst, the oxygen occlusion amount in the catalyst is estimated based upon the air/fuel ratio change time period, and the degree of deterioration of the catalyst is decided based upon the estimated oxygen occlusion amount, when alternately supplying exhaust gas of a lean air/fuel ratio and exhaust gas of a rich air/fuel ratio to the catalyst, the air/fuel ratios of the exhaust gas of a lean air/fuel ratio and the exhaust gas of a rich air/fuel ratio are set so that both the amount of the oxygen in the exhaust gas which is occluded into the catalyst per unit time during supply of exhaust gas of a lean air/fuel ratio, and the amount of the oxygen in the catalyst which is emitted into the exhaust gas per unit time during supply of exhaust gas of a rich air/fuel ratio, attain respective constant values, irrespective of the exhaust flow amount.

As previously described, with a catalyst which is endowed with an O2 storage function, when exhaust gas of a lean air/fuel ratio flows into the catalyst, the amount of oxygen in the exhaust gas which is excessive with respect to the amount of oxygen which is required for bringing the exhaust air/fuel ratio to the stoichiometric air/fuel ratio is occluded in the catalyst, so that the catalyst brings the air/fuel ratio of the exhaust which has passed through it to the stoichiometric air/fuel ratio.

Furthermore, when exhaust gas of a rich air/fuel ratio flows into the catalyst, the amount of oxygen in the exhaust gas which is deficient with respect to the amount of oxygen which is required for bringing the exhaust air/fuel ratio to the stoichiometric air/fuel ratio is emitted from the catalyst, so that the catalyst brings the air/fuel ratio of the exhaust which has passed through it to the stoichiometric air/fuel ratio.

On the other hand, the amount of the oxygen which needs to be emitted from or occluded in the catalyst per unit time in order to bring the air/fuel ratio of the exhaust gas to the stoichiometric air/fuel ratio becomes greater, the greater is the flow amount of the exhaust flowing into the catalyst; and, moreover, the greater does the deviation of the exhaust air/fuel ratio from the stoichiometric air/fuel ratio become. Accordingly, if for example the exhaust gas air/fuel ratio is the same, when the exhaust flow amount is great, in correspondence thereto the length in the exhaust gas flow axial direction of the portion of the catalyst which performs oxygen absorption or emission becomes long.

The matter described above will now be explained in terms of an example for the case in which exhaust of a rich air/fuel ratio is flowing into the catalyst. FIGS. 2A and 2B schematically show a cross section along the axial line direction of the catalyst (i.e. along the direction in which the exhaust gas is flowing). FIG. 2A shows the state directly after the air/fuel ratio of the exhaust gas flowing into the catalyst has changed from a lean air/fuel ratio to a rich air/fuel ratio, and, here, it is supposed that the oxygen storage component at each portion of the catalyst is occluding oxygen to the maximum amount to which it is capable.

As shown in FIG. 2A, when exhaust gas of a rich air/fuel ratio flows into the catalyst, due to the $O_2$ storage function of the catalyst, oxygen is emitted from the catalyst into the exhaust. Due to this, the air/fuel ratio of the exhaust gas flowing into the catalyst is elevated more and more downstream along the axial line of the catalyst, until it arrives at the stoichiometric air/fuel ratio.

When the exhaust air/fuel ratio arrives at the stoichiometric air/fuel ratio, oxygen emission from the catalyst no longer occurs. In other words, when exhaust gas of a rich air/fuel ratio flows into the catalyst, oxygen is emitted over a section R which extends from the inlet of the catalyst for a distance L towards its downstream side along the direction of the axial line of the catalyst, while, further towards the downstream side than the section R, the air/fuel ratio is equal to the stoichiometric air/fuel ratio, so that no oxygen is emitted. Due to this, as shown in FIG. 2A, the distribution of the air/fuel ratio of the exhaust gas along the axial line direction of the catalyst gradually increases from a rich air/fuel ratio at the catalyst inlet, to arrive at the stoichiometric air/fuel ratio at the final end portion of the section R.

Since, in this state, the closer to the catalyst inlet, the richer is the exhaust gas air/fuel ratio, accordingly, the closer towards the upstream side, the greater does the speed of emission of oxygen from the catalyst become. Due to this, the oxygen which is occluded in the catalyst is emitted and becomes consumed from the inlet side, so that the section R of the catalyst which performs absorption and emission of oxygen gradually shifts towards the downstream side. In other words, the sloping portion S of the air/fuel ratio curve shifts towards the downstream side along with the passage of time.

And, after the inclined portion S (the section R) has arrived at the downstream side end portion of the catalyst, exhaust gas of a rich air/fuel ratio which has not arrived at the stoichiometric air/fuel ratio starts to be discharged from the catalyst, so that, now, exhaust gas of a rich air/fuel ratio can be detected at the downstream side of the catalyst (refer to FIG. 2B).

Although, in this state, with the method described above and disclosed in Japanese Patent Application Publication No. JP-A-10-212935, it is decided to invert the exhaust air/fuel ratio at the downstream side of the catalyst, at the time point that exhaust gas of a rich air/fuel ratio has been detected at the downstream side of the catalyst, oxygen is still in the state of being occluded in the catalyst over the section R of length L. In other words, at the time point that the exhaust gas air/fuel ratio at the catalyst downstream side is inverted, the catalyst is in a state with an amount of oxygen corresponding to the section R of length L still remaining within the catalyst.

Next, FIGS. 3A and 3B are figures similar to FIGS. 2A and 2B, but showing a case in which the flow amount of the exhaust gas is greater than in the case shown in FIGS. 2A and 2B. As previously described, with this type of $O_2$ storage function, the maximum oxygen absorption and emission speed is determined by the type and by the degree of deterioration of the catalyst, and hardly varies with the exhaust flow amount. However, when the exhaust gas flow amount is large, the oxygen absorption and emission amount per unit time which is required for changing the air/fuel ratio of the exhaust gas becomes greater, as compared with the amount thereof when the exhaust flow amount is small.

Due to this, if the exhaust gas flow amount is great, corresponding to the oxygen absorption and emission amount required per unit time, as shown in FIGS. 3A and 3B, the length of the catalyst section R which performs oxygen absorption and emission becomes a longer length LL than the length L shown in FIGS. 2A and 2B, and the gradient of the sloping portion S of the air/fuel ratio graph becomes less steep, as compared to the case of FIGS. 2A and 2B. In this state, when the section R (the inclined portion S) shifts and arrives at the downstream end of the catalyst, the exhaust air/fuel ratio at the downstream end of the catalyst inverts and becomes rich (see FIG. 3B).

Although, as explained with reference to FIGS. 2A and 2B, in this state some oxygen is still occluded in the section R of the catalyst, since the length LL of the section R becomes longer than the length (L) in FIGS. 2A and 2B, accordingly, the amount of oxygen remaining in the catalyst in the state in which the air/fuel ratio of the exhaust gas which has passed through the catalyst has been inverted to a rich air/fuel ratio becomes greater than in the case shown in FIGS. 2A and 2B.

First to consider the method for deciding upon the degree of deterioration of a catalyst by employing the function of $O_2$ storage disclosed in Japanese Patent Application Publication No. JP-A-10-212935, this method is one in which, essentially, the oxygen occlusion amount due to $O_2$ storage is estimated by supposing that the time point at which, after the air/fuel ratio of the exhaust gas flowing into the catalyst has changed between lean and rich, the exhaust gas air/fuel ratio at the downstream side of the catalyst inverts to track the air/fuel ratio at its upstream side is the time point at which the entire amount of the oxygen which has been occluded in the catalyst due to the $O_2$ storage function has been emitted (or the time point at which the maximum amount of oxygen has been occluded in the catalyst due to $O_2$ storage), and deterioration of the catalyst is determined upon according to decrease of the occlusion amount.

However, as explained in FIGS. 2A, 2B, 3A, and 3B, actually, at the time point at which the air/fuel ratio at the downstream side of the catalyst has changed over between rich and lean, it is possible for some oxygen still to be remaining in the portion of the catalyst shown by the section R, or it is possible still to occlude some more oxygen in the catalyst. If the length of the section R is short (as in the case shown in FIGS. 2A and 2B), then, since the oxygen amount is comparatively small, accordingly, in the determination as to the degree of deterioration of the catalyst, no large error occurs; but, if the length of the section R is long (as in the case shown in FIGS. 3A and 3B), in other words if the exhaust flow amount is large, then the amount of oxygen which could remain in this portion, or which could still be occluded therein, becomes quite large, so that sometimes a relatively large error can occur during the determination as to the degree of deterioration of the catalyst.

Thus, in the first and second aspects of the present invention described above, the above described problem is solved by making the air/fuel ratio of the exhaust gas which is flowing into the catalyst closer to the stoichiometric air/fuel ratio when the amount of flow of the exhaust gas is large, as compared to when it is small. In other words, in these aspects of the present invention, when making the determination as to the degree of deterioration of the catalyst, if the amount of flow of the exhaust gas is large (as in the case shown in FIGS. 3A and 3B), the rich or lean air/fuel ratio of the exhaust gas flowing into the catalyst is brought closer to the stoichiometric air/fuel ratio as compared to the case when the amount of flow of the exhaust gas is small (as in the case shown in FIGS. 2A and 2B), as shown by the dotted lines in FIGS. 3A and 3B as compared to those in FIGS. 2A and 2B.

Since, as previously described, the maximum absorption or emission speed of oxygen in the catalyst due to the $O_2$ storage function hardly varies according to the exhaust flow amount or the air/fuel ratio, accordingly, even if the air/fuel ratio of the exhaust gas is brought close to the stoichiometric air/fuel ratio as shown by the dotted line I in FIGS. 3A and 3B, still the slope of the inclined portion S in the distribution of the exhaust gas air/fuel ratio does not change. Due to this, when the air/fuel ratio of the exhaust gas flowing into the catalyst is brought closer to the stoichiometric air/fuel ratio, the length of the section R in which the absorption and the emission of oxygen are performed still remains short, even if the exhaust flow amount is large as in the case shown in FIGS. 3A and 3B.

Accordingly, in this case, even at the time point at which the air/fuel ratio of the exhaust gas at the downstream side of the catalyst has inverted (FIG. 3B), the amount of oxygen which remains in the catalyst continues to decrease until it is equal to that in the case of FIG. 2B, so that it is possible to suppress occurrence of errors in the decision as to the degree of deterioration of the catalyst, even if the flow amount of the exhaust gas is large.

It should be understood that although, by way of example, the case has been described in FIGS. 3A and 3B in which the air/fuel ratio of the exhaust gases flowing into the catalyst is rich, it goes without saying that, in an analogous manner, it would also be possible to suppress errors in the decision as to the degree to which the catalyst has deteriorated if the exhaust flow amount is large for the case in which the air/fuel ratio of the exhaust gases flowing into the catalyst is lean as well, by likewise bringing the air/fuel ratio of the exhaust gases closer to the stoichiometric air/fuel ratio.

In other words, as will be understood from FIGS. 2A, 2B, 3A, and 3B, if the lean or rich air/fuel ratio of the exhaust gas which flows into the catalyst is adjusted so that the length of the oxygen absorption and emission section R is kept constant (for example at the length L shown in FIG. 2A) irrespective of the flow amount of the exhaust gas, then it is possible to minimize errors with respect to decision as to the degree of deterioration of the catalyst due to changes of the exhaust gas flow amount. The length (L, LL) of the oxygen absorption and emission section R corresponds to the amount of oxygen per unit time which is emitted from, or is absorbed by, the catalyst.

And, with the second aspect of the present invention, in addition to the features of the first aspect thereof, by controlling the air/fuel ratio of the exhaust gas flowing into the catalyst so that the amount of oxygen which is absorbed by, or emitted from, the catalyst in unit time is kept constant (in other words, so that the length of the oxygen absorption and emission section R is kept constant), it becomes possible to perform the decision as to the degree of deterioration of the catalyst with good accuracy, while minimizing the influence of changes of the flow amount of the exhaust gas upon the decision as to deterioration of the catalyst.

Moreover, according to a third aspect of the present invention, there is proposed a method for detecting deterioration of an exhaust purification catalyst in which, in the above described method for detecting catalyst deterioration according to the first aspect of the present invention, after having started the alternating supply of exhaust gas of the lean air/fuel ratio and exhaust gas of the rich air/fuel ratio, after the initial supply of exhaust gas of the rich air/fuel ratio is completed, the decision as to the degree of deterioration of the catalyst based upon the air/fuel ratio change time period is initiated.

Still further, according to a fourth aspect of the present invention, there is proposed a method for detecting deterioration of an exhaust purification catalyst in which, in the above described method for detecting catalyst deterioration according to the third aspect of the present invention, during the alternating supply of exhaust gas of the lean air/fuel ratio and exhaust gas of the rich air/fuel ratio, the exhaust gas air/fuel ratio during the initial supply of exhaust gas of the rich air/fuel ratio is set to be lower than the exhaust gas air/fuel ratio during the second and subsequent supply of exhaust gas of the rich air/fuel ratio.

As one cause which exerts an influence upon the O2 storage function of the catalyst, there may be cited sulfur poisoning of the oxygen storage component by sulfur oxides (SOx) in the exhaust gases. For example, when SOx is present in the exhaust gases, with a lean air/fuel ratio, the cerium (Ce) which is the oxygen storage component may combine with the SOx and form a sulfate. Since cerium which has thus formed a sulfate cannot combine with oxygen under conditions in which the air/fuel ratio is lean, accordingly, the more the SOx combines with the cerium to produce sulfate, the more does the amount of cerium which is available to participate in the absorption and emission of oxygen decrease, so that, as a result, the $O_2$ storage function undesirably decreases.

Accordingly, when from this state a decision as to the degree of deterioration of the catalyst is performed based upon the $O_2$ storage function, it sometimes happens that, due to decrease of the $O_2$ storage function because of the sulfur poisoning, a mistaken decision is reached that a catalyst has deteriorated, which actually has not deteriorated. On the other hand, since the coupling between the cerium and the SOx is comparatively weak, in an ambient atmosphere of a rich air/fuel ratio, it is simple and easy to desorb the SOx from the cerium, so that the basic $O_2$ storage function of the cerium can be rehabilitated.

Thus, in the above described third aspect and fourth aspect of the present invention, when deciding upon the degree of deterioration of the catalyst based upon decrease of the $O_2$ storage function by alternately supplying exhaust gas of rich air/fuel ratio and lean air/fuel ratio to the catalyst, it is arranged always to start the decision as to deterioration of the catalyst in a state in which SOx is desorbed from the cerium, in other words, from when exhaust gas of a lean air/fuel ratio is supplied to the catalyst, after the first supply of exhaust gas of a rich air/fuel ratio to the catalyst has ended. By doing this, it becomes possible to perform the decision as to the degree of deterioration of the catalyst with good accuracy, without experiencing any influence from SOx poisoning.

Furthermore, the speed of desorption of the SOx from the cerium becomes greater, the lower is the air/fuel ratio (i.e. the richer is the exhaust gas). Accordingly it is desirable, during the above described initial supply of rich air/fuel ratio exhaust gas, for the air/fuel ratio of the exhaust gas to be set lower than during the second and subsequent supply of rich air/fuel ratio exhaust gas, so that more of the SOx can be desorbed from the cerium during the initial supply of rich air/fuel ratio exhaust gas.

Yet further, according to a fifth aspect of the present invention, there is proposed a method for detecting deterioration of an exhaust purification catalyst in which, in the above described method for detecting catalyst deterioration according to the first aspect of the present invention, when making the decision as to the degree of deterioration of the catalyst, the oxygen occlusion amount is estimated based upon the air/fuel ratio change time period, and the degree of deterioration of the catalyst is decided based upon the estimated oxygen occlusion amount, during the alternating supply of exhaust gas of the lean air/fuel ratio and exhaust gas of the rich air/fuel ratio, an air/fuel ratio lower limit value for the exhaust gas of the lean air/fuel ratio and an air/fuel ratio upper limit value for the exhaust gas of the rich air/fuel ratio are set within an air/fuel ratio range in which oxygen absorption and emission operation by the catalyst takes place.

The $O_2$ storage function of the catalyst experiences an influence due to the air/fuel ratio; in fact, the absorption and emission operation of the catalyst for oxygen decreases towards the neighborhood of the stoichiometric air/fuel ratio. Because of this fact, when exhaust gas of a rich air/fuel ratio and exhaust gas of a lean air/fuel ratio are alternately supplied to the catalyst, if the lower limit value for the exhaust gas air/fuel ratio during the supply of lean air/fuel ratio exhaust gas and/or the upper limit value for the exhaust gas air/fuel ratio during the supply of rich air/fuel ratio exhaust gas are not separated from the stoichiometric air/fuel ratio to an adequate extent, then it becomes impossible to estimate the amount of oxygen which is occluded in the catalyst in an accurate manner, since the oxygen absorption and emission operation of the catalyst is undesirably decreased.

Thus, according to the fifth aspect of the present invention, by setting both the lower limit value for the exhaust gas air/fuel ratio during the supply of lean air/fuel ratio exhaust gas and the upper limit value for the exhaust gas air/fuel ratio during the supply of rich air/fuel ratio exhaust gas to a range of air/fuel ratio in which occlusion of oxygen into the catalyst and emission of oxygen from the catalyst can occur to a sufficient extent, the absorption and emission of oxygen come to be performed in an adequate manner, so that it becomes possible to perform the decision as to the degree of deterioration of the catalyst with good accuracy, since it is possible to estimate the amount of oxygen which is occluded in the catalyst at high accuracy.

Even further, according to a sixth aspect of the present invention, there is provided a device for detecting deterioration of an exhaust purification catalyst, comprising: an exhaust air/fuel ratio control device which alternately supplies exhaust gas of a lean air/fuel ratio and exhaust gas of a rich air/fuel ratio to the catalyst, and brings the air/fuel ratio of the lean air/fuel ratio exhaust gas and the air/fuel ratio of the rich air/fuel ratio exhaust gas thus alternately supplied to the catalyst closer to the stoichiometric air/fuel ratio, when the exhaust gas flow amount supplied to the catalyst is great, as compared to when the exhaust gas flow amount supplied to the catalyst is small; an air/fuel ratio change time period detection device which detects the air/fuel ratio change time period from the initiation of supply of lean air/fuel ratio exhaust gas to the catalyst until the air/fuel ratio of the exhaust gas on the catalyst downstream side changes over to a lean air/fuel ratio, or the air/fuel ratio change time period from the initiation of supply of rich air/fuel ratio exhaust gas to the catalyst until the air/fuel ratio of the exhaust gas on the catalyst downstream side changes over to a rich air/fuel ratio; and a catalyst deterioration decision device which decides upon the degree of deterioration of the catalyst, based upon at least one of the air/fuel ratio change time period from the initiation of supply of lean air/fuel ratio exhaust gas to the catalyst until the air/fuel ratio of the exhaust gas on the catalyst downstream side changes over to a lean air/fuel ratio, or the air/fuel ratio change time period from the initiation of supply of rich air/fuel ratio exhaust gas to the catalyst until the air/fuel ratio of the exhaust gas on the catalyst downstream side changes over to a rich air/fuel ratio.

According to each of these aspects of the present invention, the beneficial effect is obtained that it becomes possible to make a decision as to deterioration of the exhaust purification catalyst, irrespective of the exhaust flow amount.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Figure 1:
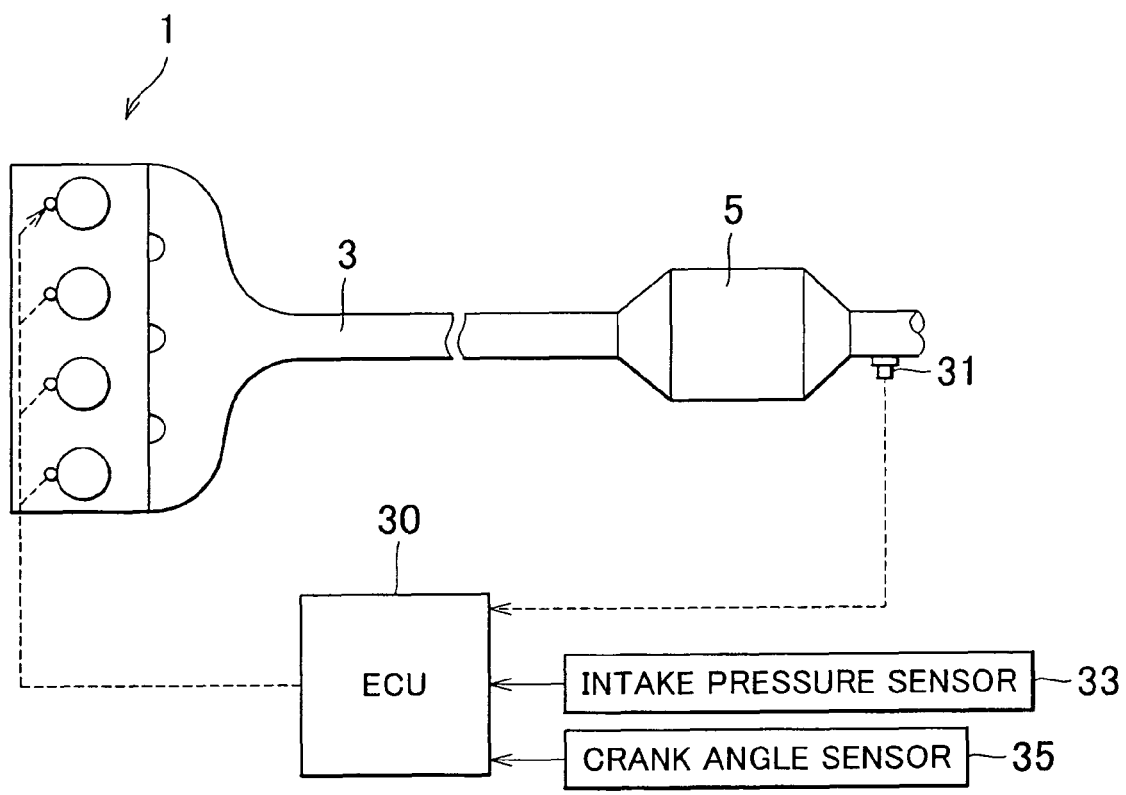
FIG. 1 is a figure for explanation of the general structure of an embodiment of the present invention, as applied to an internal combustion engine for an automobile.
Figure 2A:
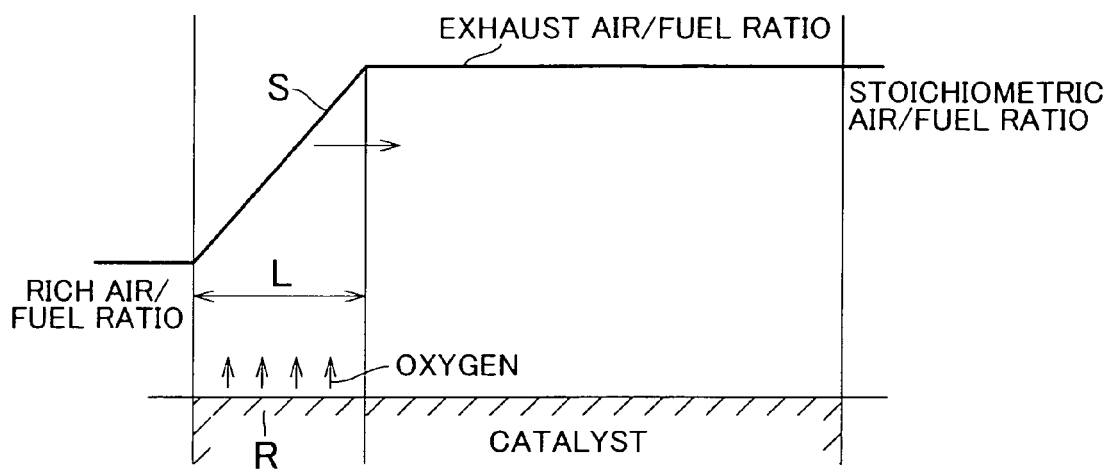
FIGS. 2A and 2B are figures for explanation of the oxygen emission operation of a catalyst.
Figure 2B:
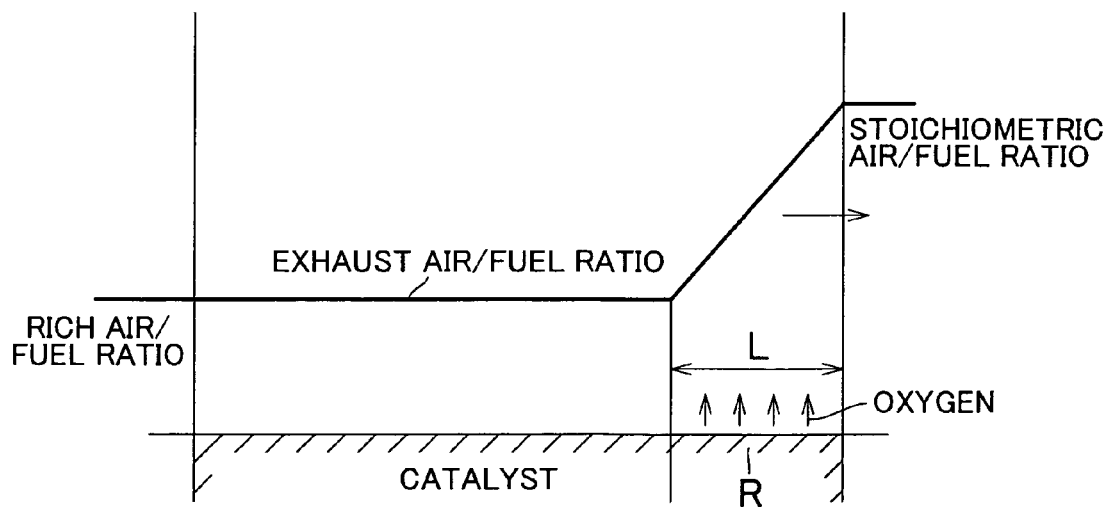
Figure 3A:
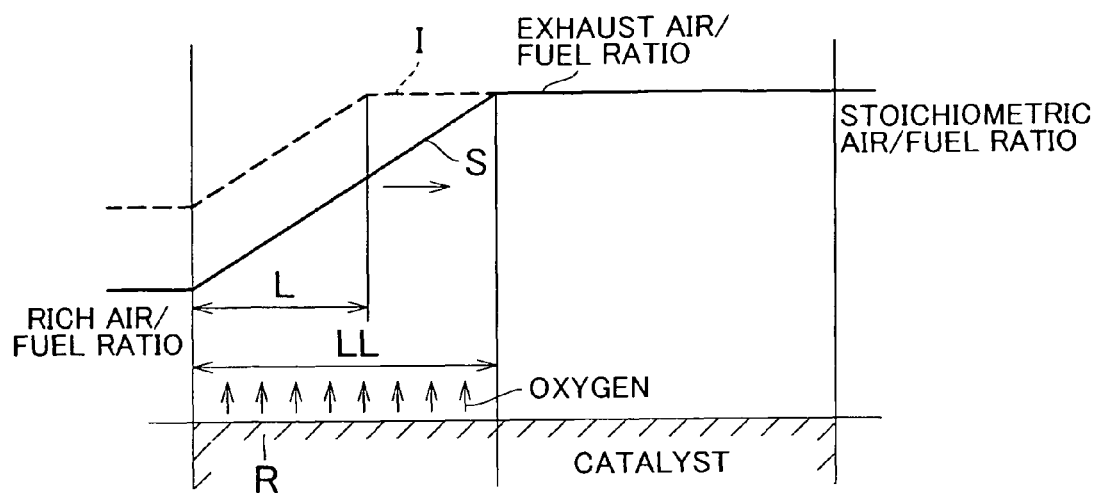
FIGS. 3A and 3B are figures for explanation of the oxygen emission operation of the catalyst, when the flow amount of the exhaust is great.
Figure 3B:
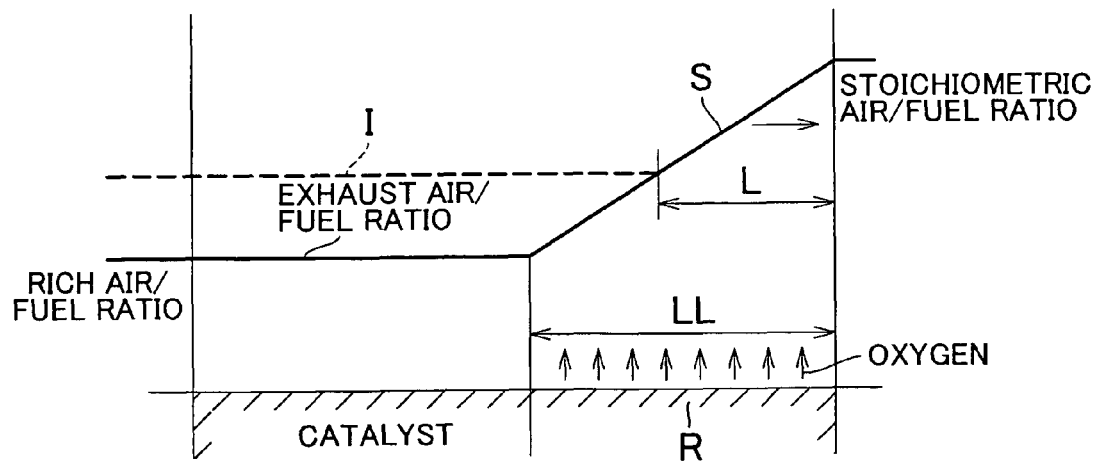

In the following, an embodiment of the present invention will be explained with reference to the appended drawings. FIG. 1 is a schematic figure for explanation of the general structure of an embodiment of the present invention, as applied to an internal combustion engine for an automobile.

In FIG. 1, there are shown an engine 1, an exhaust passage 3 of the engine 1, and an exhaust purification catalyst 5 (hereinafter termed a "catalyst") which is provided upon the exhaust passage 1. In this embodiment, as the catalyst 5, there is employed a three-way catalyst which, when the air/fuel ratio of the exhaust gas flowing in the exhaust passage 3 is in a region in the neighborhood of the stoichiometric air/fuel ratio, is capable of purifying all three of the components HC, CO, and NOx in the exhaust gas at the same time.

The catalyst 5 is made by forming a thin coating of alumina upon a support surface of Cordurite or the like made in the form of a honeycomb, with a catalyst component made from some type of noble metal such as platinum (Pt), palladium (Pd), rhodium (Rh) or the like being carried upon the alumina layer. Furthermore, in addition to the noble metal catalyst component upon the carrier alumina layer, by adding a metallic oxide component such as cerium (Ce) or the like as an oxygen storage component, the catalyst 5 is endowed with an $O_2$ storage function (i.e. an oxygen storage function).

The cerium which is carried upon the alumina layer stores oxygen by the formation of ceria (cerium oxide IV: $CeO_2$) by combining with oxygen within the exhaust gas when the air/fuel ratio of the exhaust which is flowing through the catalyst is higher than the stoichiometric air/fuel ratio (i.e. when the exhaust air/fuel ratio is lean). Furthermore, when the air/fuel ratio of the exhaust flowing through the catalyst is less than the stoichiometric air/fuel ratio (i.e. when the exhaust air/fuel ratio is rich), oxygen is emitted, because the ceria emits oxygen and is converted to cerium oxide III ($Ce_2O_3$). In other words, by carrying cerium upon the catalyst 5, oxygen is emitted from the catalyst 5 when the air/fuel ratio of the exhaust flowing through the catalyst 5 is rich, while, when the air/fuel ratio of the exhaust flowing through the catalyst 5 is lean, excessive oxygen is occluded by the catalyst 5 and $O_2$ storage operation is performed; so that, when the air/fuel ratio of the exhaust flowing through the catalyst 5 fluctuates more or less either towards rich or towards lean, the exhaust air/fuel ratio after it has flowed through the catalyst 5 becomes in the neighborhood of the stoichiometric air/fuel ratio. By endowing the catalyst 5 with the function of storing $O_2$, it is ensured that all three of the components HC, CO, and NOx flowing into the catalyst 5 are purified at the same time, so that the exhaust purification efficiency is enhanced.

An electronic control unit (ECU) 30 of the engine 1 shown in FIG. 1 may consist, for example, of a per se known type of microcomputer, and, apart from performing basic control of the engine 1 such as fuel injection, ignition timing, and the like, in this embodiment of the present invention, the ECU 30 also performs operation for making a deterioration decision as to what extent the catalyst 5 has deteriorated, as will be described hereinafter.

In order for these various forms of control to be performed, to an input port of the ECU 30, a voltage signal which corresponds to the engine intake pressure PM is supplied from an intake pressure sensor 33 provided in the intake passage of the engine 1, and a pulse signal is supplied from a crank angle sensor 35 which is provided in the neighborhood of the crank shaft of the engine 1 every time the crank shaft of the engine 1 rotates through a certain constant rotational angle.

The ECU 30, along with calculating the engine rotational speed NE from the frequency of the crank angle pulse signal which is inputted from the crank angle sensor 35, also calculates the present crank angle based upon the number of pulses from a reference position (for example, the compression top dead center of the #1 cylinder).

Furthermore, based upon the engine rotational speed NE which has been calculated as above and upon the engine intake pressure PM which has been detected by the intake pressure sensor 33, the ECU 30 also calculates a fuel injection amount for maintaining the combustion air/fuel ratio for each of the cylinders of the engine 1 at a target air/fuel ratio (in this embodiment, the stoichiometric air/fuel ratio).

Moreover, in this embodiment, an air/fuel ratio sensor 31 is provided at the downstream side of the catalyst 5, and the air/fuel ratio sensor 31 supplies a voltage signal to the ECU 30 which corresponds to the air/fuel ratio of the exhaust gas after it has passed through the catalyst 5. As the air/fuel ratio sensor 31 of this embodiment, there may be employed either a so called Z-type output oxygen sensor which detects the oxygen density within the exhaust gas and changes its output rapidly at the boundary near the stoichiometric air/fuel ratio according as to whether the air/fuel ratio is rich or lean, or a so called linear air/fuel ratio sensor which outputs a signal which corresponds one to one with the exhaust air/fuel ratio over a broad range of air/fuel ratio.

Next, the operation of this embodiment for making the decision as to whether or not the catalyst has deteriorated will be explained. In this embodiment, the amount by which the catalyst 5 has deteriorated is decided upon by alternately changing the air/fuel ratio of the exhaust gas which flows into the catalyst 5 between rich and lean, and by measuring the timing at which the air/fuel ratio of the exhaust gas which has passed through the catalyst 5 changes.

In more detail, as will be described hereinafter, in the operation for making the decision as to whether or not the catalyst has deteriorated, first, the ECU 30 controls the fuel injection amount of the engine 1 so as to maintain the air/fuel ratio of the exhaust gas which flows into the catalyst 5 (in other words, the operating air/fuel ratio of the engine 1) at a predetermined rich or lean air/fuel ratio.

For example, when the fuel injection amount is controlled so that the operating air/fuel ratio of the engine 1 becomes a predetermined lean air/fuel ratio AFL, the oxygen within the exhaust which is excessive with respect to the stoichiometric air/fuel ratio is occluded in the catalyst 5 by the $O_2$ storage operation described above, so that the air/fuel ratio of the exhaust gas which has passed through the catalyst 5 is maintained in the neighborhood of the stoichiometric air/fuel ratio.

And, as with the oxygen storage component of the catalyst 5 progressively becomes saturated with occluded oxygen, the section R of the catalyst 5 which is active in performing oxygen absorption and emission shifts to the downstream side, and, when the active section R for performing oxygen absorption and emission arrives at the downstream end portion of the catalyst 5, then the air/fuel ratio of the exhaust gas which has passed through the catalyst 5 becomes a lean air/fuel ratio which tracks the air/fuel ratio of the exhaust gas at the upstream side of the catalyst. In this situation, the catalyst 5 is in a state in which it has occluded almost the maximum amount of oxygen of which it is capable, although a residual oxygen occlusion capability does remain in the section R which performs oxygen absorption and emission.

And, when the ECU 30 detects this state (in other words, when the exhaust air/fuel ratio of the exhaust gas detected by the air/fuel ratio sensor 31 at the downstream side of the catalyst 5 has changed to a lean air/fuel ratio), next, the ECU 30 controls the fuel injection amount to the engine 1 so that the air/fuel ratio of the exhaust gas which is flowing into the catalyst 5 becomes a predetermined rich air/fuel ratio AFR.

Due to this, the air/fuel ratio of the exhaust gas flowing into the catalyst 5 changes from lean to rich, and now the oxygen which was occluded due to the $O_2$ storage function of the catalyst 5 starts to be emitted into the exhaust gas, so that the air/fuel ratio of the exhaust gas which has passed through the catalyst 5 comes to be maintained in the neighborhood of the stoichiometric air/fuel ratio. And, when the entire amount of the oxygen which was occluded in the catalyst 5 is emitted, the air/fuel ratio of the exhaust gas which has passed through the catalyst 5 changes to a rich air/fuel ratio. When the ECU 30 detects this timing with the air/fuel ratio sensor 31, in again arranges for the exhaust gas air/fuel ratio flowing into the catalyst 5 to be equal to the predetermined lean air/fuel ratio AFL.

The ECU 30 alternately changes over the air/fuel ratio of the exhaust gas flowing into the catalyst 5 between rich and lean as described above, and the ECU 30 calculates the amount of oxygen which has been absorbed and emitted during each rich/lean cycle by the catalyst 5, by integrating the value of an oxygen absorption/emission amount counter over the time period from the time point at which the air/fuel ratio is changed over, until the sensor output of the air/fuel ratio sensor 31 at the downstream side of the catalyst 5 changes to tracking. The details of the oxygen absorption/emission amount counter will be described in detail hereinafter.

When the $O_2$ storage function of the catalyst 5 deteriorates, the amount of oxygen which is absorbed and emitted during the above described rich/lean cycle decreases in correspondence thereto. In this embodiment, it is arranged for the ECU 30 to decide that the catalyst 5 has deteriorated to a level at which some problem may occur during use, when the oxygen absorption and emission amount which is calculated by the method described above has decreased down to some level.

However, as explained using FIGS. 2A through 3B, if the same rich and lean air/fuel ratios (AFR and AFL) are used when the exhaust flow amount is great as when the exhaust flow amount is small, then the length of the oxygen absorption and emission section R of the catalyst 5 becomes great, so that it becomes impossible to detect the decrease of the $O_2$ storage function of the catalyst 5 accurately, since the absorption and emission of oxygen is not completed at the time point that the exhaust gas air/fuel ratio has changed at the downstream side of the catalyst 5.

Thus, in this embodiment, the rich and lean air/fuel ratios (AFR and AFL) are changed in correspondence to the exhaust gas flow amount, so that the problem described above is solved (refer to FIGS. 3A and 3B). In the following, the operation for making the decision as to whether the catalyst has deteriorated, according to this embodiment of the present invention, will be explained in concrete terms with reference to FIGS. 4 through 8.

Figure 4:
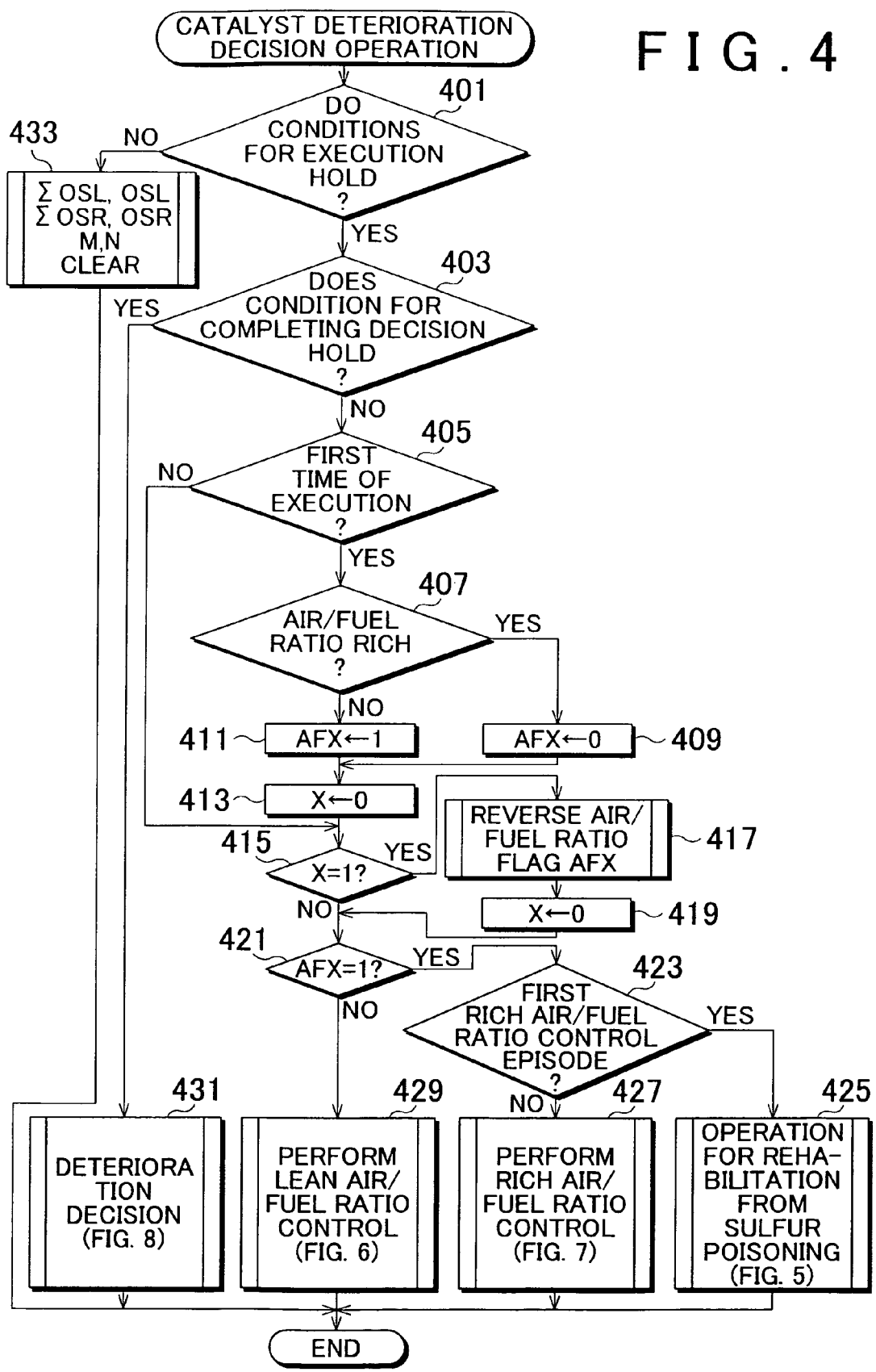
FIG. 4 is a flow chart for explanation of a decision as to whether or not the catalyst has deteriorated.

FIG. 4 is a flow chart for explanation of the overall operation for the decision in this embodiment as to whether or not the catalyst has deteriorated. This operation is performed by a routine which is, for example, executed at fixed intervals by the ECU 30. The steps 401 through 413 of the FIG. 4 flow chart show the operational preparations for the catalyst deterioration decision.

Referring to the flow chart, each time the operations of FIG. 4 are performed, first, in the step 401, a decision is made as to whether or not certain conditions for making a decision as to deterioration of the catalyst 5 hold at the present.

These conditions for making a decision as to deterioration may be, for example, that the warming up of the engine 1 has been completed, that the catalyst 5 has arrived at the catalyst activation temperature, that the engine 1 is in a steady operational state in which it is possible to change the engine operating air/fuel ratio to and fro between rich and lean, that the temperature of the air/fuel ratio sensor 31 on the downstream side of the catalyst 5 has arrived at an activation temperature, and the like.

If any one or more of the conditions described above does not hold, then the operation for making a decision as to deterioration of the catalyst is not started, counters ΣOSL, OSL, ΣOSR OSR, M and N are cleared in a step 433 which will be described hereinafter, and the engine 1 is operated at its normal target air/fuel ratio (for example the stoichiometric air/fuel ratio). Furthermore, if execution of the operation for making a catalyst deterioration decision is in progress, the execution is stopped.

On the other hand, if in the step 401 it is decided that all of the conditions for making a decision as to deterioration do hold, next, in a step 403, a decision is made as to whether or not a certain condition for completing the deterioration decision holds. As will be described hereinafter, in the operation, the decision is completed by making a decision as to whether or not the catalyst 5 has deteriorated, when the absorption and emission amounts of oxygen have been measured just a predetermined amount of times, both for a rich air/fuel ratio and for a lean air/fuel ratio.

If in the step 403 the result of the decision as to whether or not measurements have been completed the predetermined number of times both for a rich air/fuel ratio and for a lean air/fuel ratio, which is made using the values of counters M and N which will be described hereinafter, is that such measurements have been completed, then the operation for making a decision as to the deterioration of the catalyst 5 is completed by making, in a step 431, the actual decision as to whether or not the catalyst 5 has indeed deteriorated. The deterioration decision of the step 431 will be described in detail hereinafter.

If in the step 403 it is decided that the above stated condition for completing the deterioration decision does not hold, then the flow of control proceeds to a step 405, and a decision is made as to whether or not this time of operational execution is the first time of operational execution from when the execution condition of the step 401 became effective; and steps 407 through 413 are executed, if and only if this is the first time of operational execution.

In these steps 407 through 413, first a decision is made (in a step 407) as to whether or not, at the present, the engine 1 is operating at a rich air/fuel ratio; and, if in fact the engine 1 is currently operating at a rich air/fuel ratio, then an air/fuel ratio flag AFX is set to 0 (lean) (a step 409), or if the engine 1 is not currently operating at a rich air/fuel ratio, then the air/fuel ratio flag AFX is set to 1 (rich) (a step 411); and in a step 413, along with the setting, the value of a measurement end flag X is set to 0.

The air/fuel ratio flag AFX is a flag for determining which of lean air/fuel ratio control or rich air/fuel ratio control is to be performed, for measuring an $O_2$ storage function which will be described hereinafter (i.e. the oxygen absorption amount or the oxygen emission amount); and, if AFX=1, then rich air/fuel ratio control (measurement of oxygen emission amount) is performed, while, if AFX=0, then lean air/fuel ratio control (measurement of oxygen occlusion amount) is performed.

In other words, by executing the steps 407 through 413 during the first initial operation after the condition for execution holds, if the engine 1 is operating at a rich air/fuel ratio when the condition for execution first holds, then lean air/fuel ratio control comes to be performed, while, if the engine is operating at a lean air/fuel ratio when the condition for execution first holds, then rich air/fuel ratio control comes to be performed; so that measurement of the oxygen absorption amount or the oxygen emission amount comes to be performed, corresponding to the state of oxygen occlusion or oxygen emission of the catalyst 5 when the execution condition first holds.

The measurement end flag X of the step 413 is a flag which shows whether or not, in the lean air/fuel ratio control or rich air/fuel ratio control, the measurement of the oxygen absorption amount or the oxygen emission amount has ended. After executing the step 413, or, if in the step 405 it was determined that this is not the initial time of execution, after skipping past the steps 407 through 413 from the step 405, next, a step 415 is executed.

In the step 415, a decision is made as to whether or not the value of the measurement end flag X is set to 1 ("end"); and, if X=0 (i.e. "do not end"), then the flow of control proceeds to a step 421. Furthermore, if X=1 (i.e. "end"), then in a step 417 the value of the air/fuel ratio flag AFX is inverted (in other words, if the present value of AFX is 0 it is set to 1, while if it is 1 it is set to 0—i.e. the value is changed over); and then in a step 419 the value of the measurement end flag X is set to 0 ("not finished").

By executing the steps 415 through 419, if the measurement has not been completed (X=0), then the value of the air/fuel ratio flag AFX is not changed; while, if the measurement has been completed (X=1), then the value of the air/fuel ratio flag AFX is inverted in the step 417. By doing this, each time the measurement is ended, a switchover is alternately performed between rich air/fuel ratio control and lean air/fuel ratio control, so that exhaust with a rich air/fuel ratio and exhaust with a lean air/fuel ratio are alternately supplied to the catalyst 5.

The steps 421 through 429 are the measurement operation for the oxygen absorption and emission amounts. In these steps 421 through 429, according to the value of the air/fuel ratio flag AFX, the engine 1 is operated with the predetermined lean air/fuel ratio AFL or with the predetermined rich air/fuel ratio AFR, and the oxygen occlusion amount or the oxygen emission amount of the catalyst 5 is calculated, respectively.

Moreover, in this embodiment, during the initial rich air/fuel ratio control from when the condition of the step 401 holds, an operation for rehabilitation from sulfur poisoning is performed, in order to desorb any sulfur oxide which may have occluded into the ceria of the catalyst 5. In other words, in the step 421, a decision is made as to whether or not the value of the air/fuel ratio flag AFX is set to 1 (rich), and if the value of the air/fuel ratio flag AFX is set to 1, then the flow of control is transferred to a step 423 in order to perform rich air/fuel ratio control. At this time, a decision is made in the step 423 as to whether or not the rich air/fuel ratio control is the first initial rich air/fuel ratio control after the execution condition in the step 401 holds; and, if this is the initial rich air/fuel ratio control, then normal rich air/fuel ratio control (in a step 427) is not performed, but instead sulfur ($So_x$,) poisoning rehabilitation control is performed (a step 425).

Figure 5:
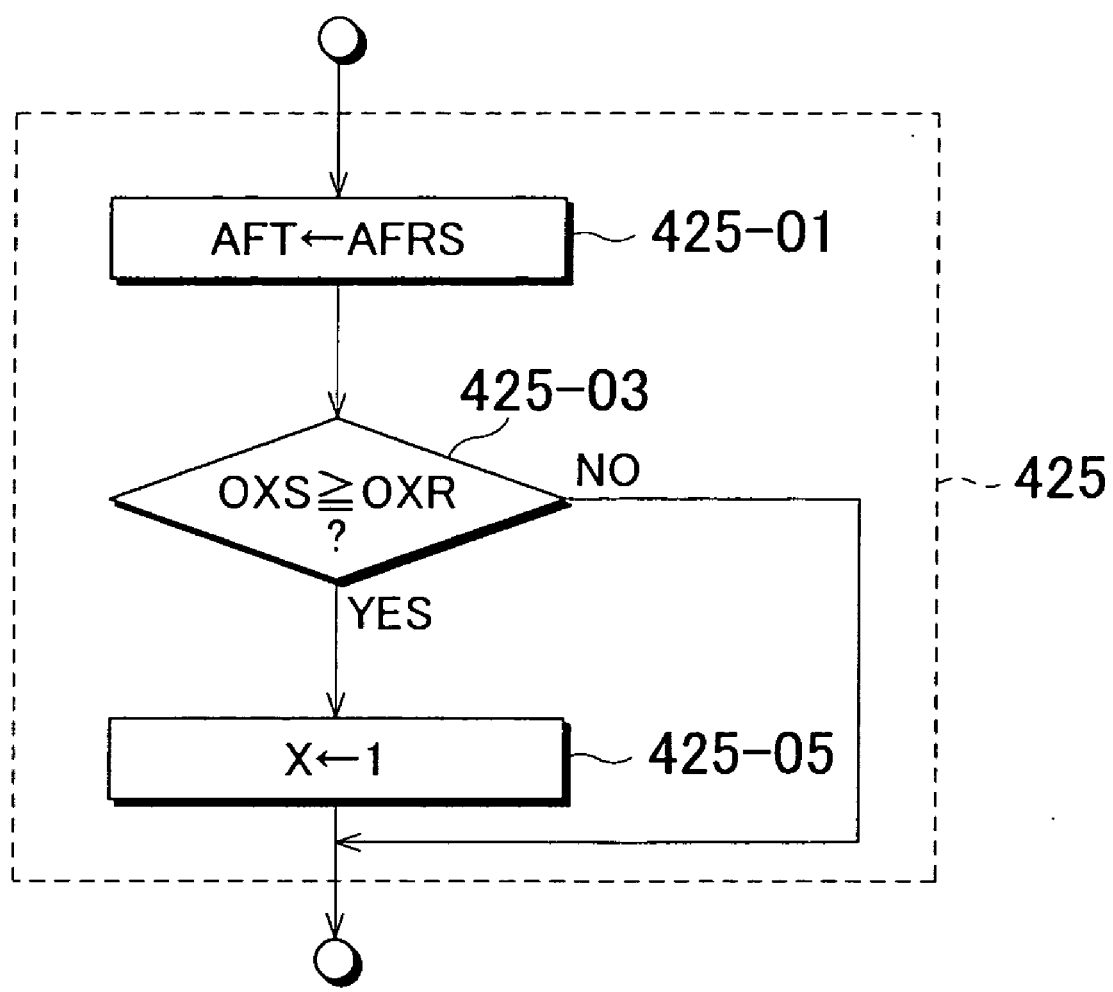
FIG. 5 is a flow chart for explanation of the details of an operation for rehabilitation from sulfur poisoning shown in FIG. 4.

FIG. 5 is a flow chart showing the details of the operation for rehabilitation from sulfur poisoning of the step 425. In the operation for rehabilitation from sulfur poisoning, first, the target air/fuel ratio AFT of the engine 1 is set to a rich air/fuel ratio AFRS which is determined in advance (a step 425-01 of FIG. 5). The value AFRS is a value which is to an air/fuel ratio lower limit value RMIN during rich air/fuel ratio control which will be described hereinafter, and is an air fuel ratio which is somewhat lower (richer) than the target air/fuel ratio during the normal rich air/fuel ratio control (of the step 427).

When the target air/fuel ratio AFT is set to AFRS, in an operation for calculating the fuel injection amount which is separately performed, the necessary fuel injection amounts for maintaining the operating air/fuel ratio of the engine 1 at AFRS is calculated based upon the intake air amount GA of the engine 1, and fuel injection is performed so that the fuel injection amount from the fuel injection valve of each cylinder becomes these calculated values. By doing this, the operating air/fuel ratio of the engine 1 is set to the target air/fuel ratio AFT, and exhaust gas having a rich air/fuel ratio, i.e. whose air/fuel ratio (AFRS) is quite low, is supplied to the catalyst 5.

In a step 425-03, a decision is made as to whether or not the operation for rehabilitation from sulfur poisoning has been completed. In this embodiment, in the same manner as during normal rich air/fuel ratio control, when the output OXS of the air/fuel ratio sensor 31 at the downstream side of the catalyst 5 indicates a value which is greater than or equal to a decision value OXR corresponding to a rich air/fuel ratio, the operation for rehabilitation from sulfur poisoning is ended, and the value of the measurement end flag X is set to 1 in a step 425-05. By doing this, when the routine of FIG. 4 is executed the next time, since the air/fuel ratio flag AFX is inverted in the steps 415 through 419, lean air/fuel ratio control is initiated in the next operation.

By supplying exhaust of a lower air/fuel ratio than normal (in other words whose richness is somewhat great) to the catalyst 5 in the manner the first time rich air/fuel ratio control is. performed, desorption of the sulfur component which is combined with the cerium oxygen storage component of the catalyst 5 comes to be sufficiently performed, and accordingly it becomes possible for the catalyst 5 to manifest its $O_2$ storage function to a sufficient extent.

As shown in FIG. 5, in the embodiment, the measurement of the oxygen emission amount is not performed during the initial rich air/fuel ratio control (i.e. during the sulfur poisoning rehabilitation control). It should be understood that the decision value OXR of the step 425-03 is a reference value for the rich air/fuel ratio decision. In this embodiment, an air/fuel ratio sensor 31 like, for example, an air/fuel ratio sensor or the like which has a Z-type output characteristic is employed, whose output becomes the greater, the richer is the air/fuel ratio; and accordingly, in the step 425-30, a decision is made that the air/fuel ratio of the exhaust gas which has passed through the catalyst 5 has become a rich air/fuel ratio, if the output of the sensor 31 has become greater than or equal to the decision value OXR.

When in the steps 423 to 425 the initial rich air/fuel ratio control is completed and the measurement end flag X is set to 1, in the next pass through the routine of FIG. 4, the value of the air/fuel ratio flag AFX is inverted, and the lean air/fuel ratio control of the step 429 is performed.

Figure 6:
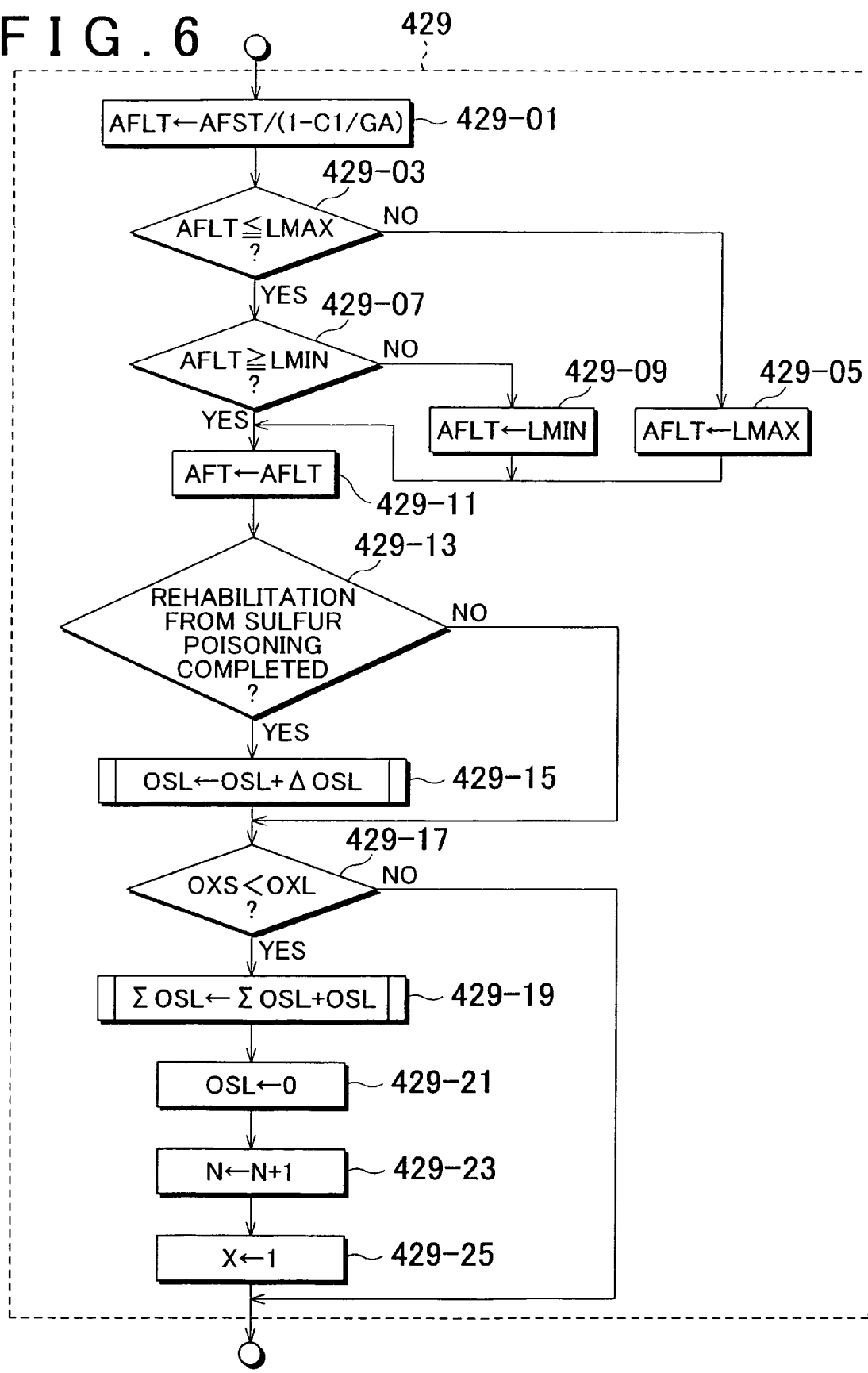
FIG. 6 is a flow chart for explanation of the details of lean air/fuel ratio control shown in FIG. 4.

FIG. 6 is a flow chart showing the details of the lean air/fuel ratio control which is performed during the step 429. In the lean air/fuel ratio control of FIG. 6, first, in a step 429-01, a lean target exhaust air/fuel ratio AFLT during lean air/fuel ratio control is calculated according to the equation:

$$AFLT = AFST/(1-(C1/GA)) \quad (1)$$

In Equation (1), AFST is the stoichiometric air/fuel ratio, and GA is the engine intake air flow amount (the flow amount by weight). As previously described, in this embodiment, during lean air/fuel ratio control, the lean target exhaust air/fuel ratio AFLT is set so that the amount of oxygen which is occluded per unit time in the catalyst 5 is a constant value, irrespective of the exhaust flow amount.

Now, if the air/fuel ratio is AFL (lean), then the fuel amount (weight) GL which is supplied to the engine 1 during a unit time period is given by GL=GA/AFL. However, the amount of air which is necessary in order to generate exhaust gas of the stoichiometric air/fuel ratio AFST by perfectly combusting the amount of fuel GL is only AFST×GL. In other words, if the exhaust gas has an air/fuel ratio of AFL, and with an engine intake air flow amount of GA, air of a surplus flow amount of GA−AFST×GL with respect to exhaust of the stoichiometric air/fuel ratio comes to be included. When this is converted into an amount of oxygen, the surplus oxygen amount becomes $C_0$×(GA−AFST×GL), (where $C_0$ is the density of oxygen in the air).

Since, due to the O2 storage function with which the catalyst 5 is endowed, the oxygen in the exhaust gas is occluded and the exhaust air/fuel ratio downstream of the catalyst 5 becomes equal to the stoichiometric air/fuel ratio, accordingly the above described surplus amount $C_0$×(GA−AFST×GL) of oxygen per unit time is occluded in the catalyst 5.

Accordingly, in order to keep the oxygen occlusion amount of the catalyst per unit time described above at a constant value, irrespective of the engine intake air flow amount GA (i.e. the exhaust flow amount), it is necessary for (GA−AFST×GL)×$C_0$=CONST (a constant) to hold true.

When the above described Equation is transformed using the relationship GL=GA/AFL, it becomes (GA−AFST×GA/AFL)=$C_1$ (a constant value), and, if the lean target exhaust air/fuel ratio is termed AFLT, when the Equation is transformed, we obtain the Equation:

$$AFLT = AFST/(1-(C_1/GA)) \quad (1)$$

As shown by Equation (1), the lean target exhaust air/fuel ratio AFLT comes more to approach the stoichiometric air/fuel ratio AFST, the greater the exhaust flow amount GA becomes. In a step 429-01, the lean target exhaust air/fuel ratio AFLT during lean air/fuel ratio control is calculated using the above described Equation (1).

Furthermore, the lean target exhaust air/fuel ratio AFLT which has been calculated in the step 429-01 is limited, in steps from 429-03 through 429-11, so as not to exceed a range of which the upper limit value is LMAX and the lower limit value is LMIN. The upper limit value LMAX is the upper limit value for the air/fuel ratio at which no negative influence is exerted upon the operation of the engine 1, while the lower limit value LMIN is taken as being a lean air/fuel ratio of a range in which the occlusion of oxygen by the ceria is adequately performed, so that the operation of the catalyst 5 for oxygen occlusion takes place properly.

It should be understood that it is desirable to determine the optimum values for the constant $C_1$ in the above described Equation (1), and the upper and lower limit values LMAX and LMIN for the air/fuel ratio, by experiment using the actual catalyst 5 and the actual internal combustion engine 1, since they may differ according to the type of the catalyst 5 and the type of the engine 1.

And, in a step 429-11, if the lean target exhaust air/fuel ratio AFLT which has been calculated in the step 429-01 is between its upper and lower limit values, then, if the value which has been calculated in the step 429-01 exceeds the range of the upper and lower limit values of AFLT which have been calculated, the upper limit value or the lower limit value is set as the actual air/fuel ratio target value AFT.

And, in a step 429-13, a decision is made as to whether or not the operation of FIG. 5 for rehabilitation from sulfur poisoning has already been finished; and, if it has been finished, in a step 429-15, the value of an oxygen occlusion amount counter OSL is counted up.

But, if in the step 429-13 it is decided that the operation for rehabilitation from sulfur poisoning is not finished, then the step 429-15 is skipped, and the flow of control proceeds to a step 429-17.

In this case, the measurement of the oxygen occlusion amount as described hereinafter is not performed. In other words, the measurement of the oxygen occlusion amount (i.e. of the absorption and emission amount) is always initiated from the time of lean air/fuel ratio control, directly after the first initial rich air/fuel ratio control (the operation for rehabilitation from sulfur poisoning) has been completed.

Next, the oxygen occlusion amount counter OSL will be explained. The oxygen occlusion amount counter OSL is a counter which indicates the oxygen amount occluded in the catalyst 5 from when the lean air/fuel ratio control has been initiated. As previously described, if the flow amount of exhaust gas which flows into the catalyst 5 is supposed to be GA, and the fuel injection amount per unit time of the engine is supposed to be GL, then an amount per unit time of oxygen of $C_0 \times (GA - AFST \times GL)$ is occluded in the catalyst 5 (where AFST is the stoichiometric air/fuel ratio, and $C_0$ is the density of oxygen in the air). Accordingly, if the operation of FIG. 4 (FIG. 6) is supposed to be executed at intervals of $\Delta t$, then the oxygen occlusion amount increases, every time the routine of FIG. 6 is executed, by just $\Delta OSL = \Delta t \times C_0 \times (GA - AFST \times GL)$.

And, in a step 429-15, an increment $\Delta OSL$ for the oxygen occlusion amount counter OSL is calculated according to the Equation described above, and the value of the oxygen occlusion amount OSL is increased by just that value $\Delta OSL$. It should be understood that in this embodiment, as previously described, the air/fuel ratio target value AFL is set so that the value of $\Delta OSL$ is an approximately constant value.

After the value of the oxygen occlusion amount counter OSL has been increased by the above procedure, in a step 429-17, a decision is made as to whether or not the output OXS of the air/fuel ratio sensor 31 on the downstream side of the catalyst 5 is smaller than a decision value OXL which is a value corresponding to a lean air/fuel ratio, in other words as to whether or not the exhaust air/fuel ratio at the downstream side of the catalyst 5 has been inverted to the lean side or not. If in the step 429-17 it is determined that the exhaust air/fuel ratio at the downstream side of the catalyst 5 has been inverted to the lean side, then this means that oxygen has been occluded into the catalyst 5 to the maximum extent of which it is capable.

Thus, in this case, in a step 429-19, an integrated value $\Sigma OSL$ is obtained by integrating the oxygen occlusion amount counter OSL for the lean air/fuel ratio control into the measurement value up through the previous measurement value, and, in a step 429-21, along with clearing the oxygen occlusion amount counter OSL, the value of a lean air/fuel measurement number of times counter N is increased by just 1, and then in a step 429-25 the value of a measurement end flag X for indicating that the measurement has been completed is set to 1. By doing this, when the operation of FIG. 4 is executed the next time, instead of the lean air/fuel ratio control of the step 429, the rich air/fuel ratio of the step 427 will come to be performed.

Furthermore, if in the step 429-17 it is decided that the exhaust air/fuel ratio is not inverted to the lean side, then the steps 429-19 through 429-25 are skipped, and, since the value of the measurement end flag X is kept at 0, even when the operation of FIG. 4 is performed the next time, the lean air/fuel ratio control and the increase of the oxygen occlusion amount counter OSL will be continued.

Figure 7:
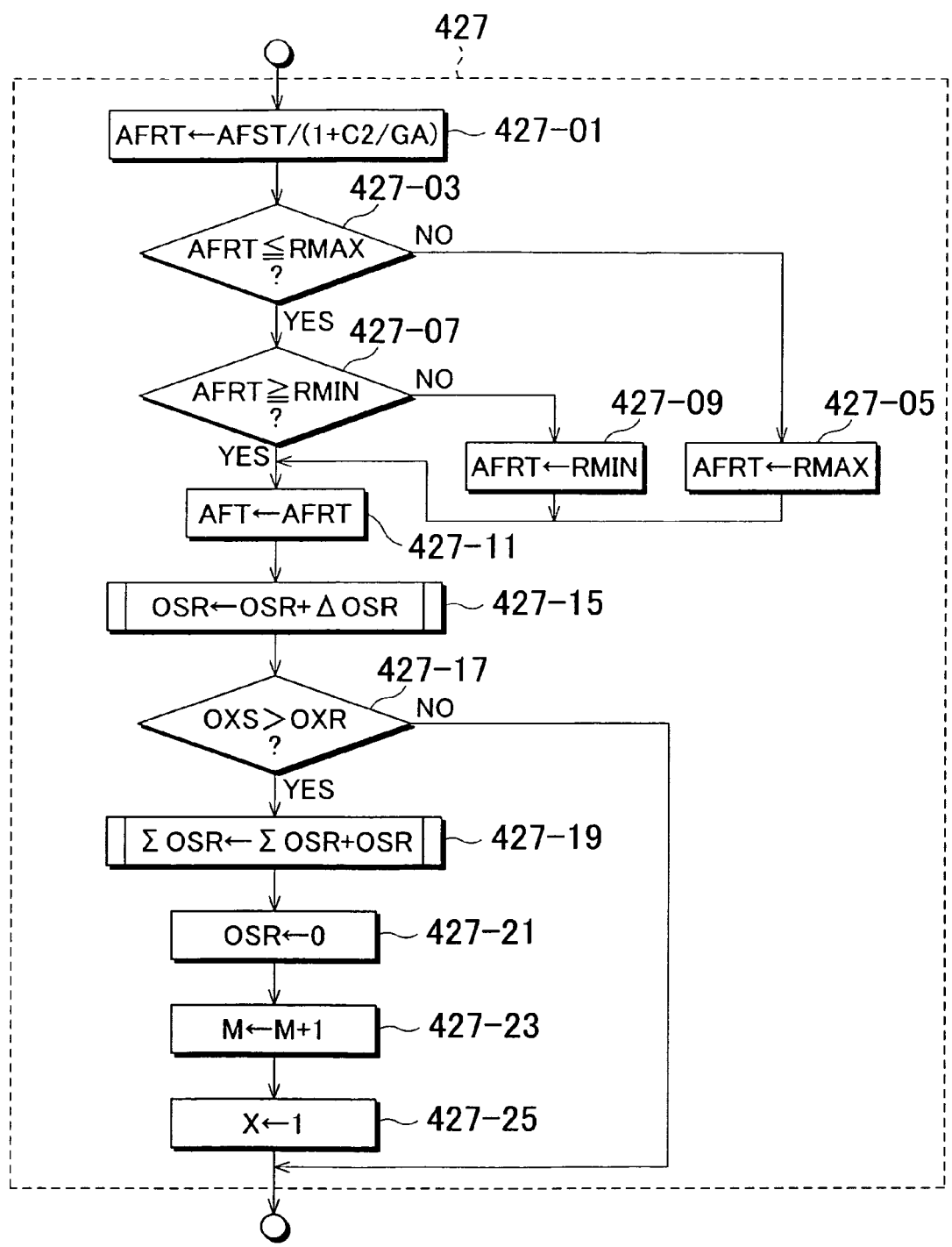
FIG. 7 is a flow chart for explanation of the details of rich air/fuel ratio control shown in FIG. 4.

FIG. 7 is a flow chart for explanation of the details of the rich air/fuel ratio control operation of the step 427 of FIG. 4. In the rich air/fuel ratio control operation, the same operations are performed as in the lean air/fuel ratio control operation of FIG. 6, *mutatis mutandis*. Here, the value AFRT of the step 427-01 denotes the rich target exhaust air/fuel ratio during the rich air/fuel ratio control. The rich target exhaust air/fuel ratio AFRT is calculated as the oxygen amount which is emitted during the rich air/fuel ratio control from the catalyst 5 due to its $O_2$ storage function (in other words, is set so that the oxygen amount per unit time which is required for keeping the exhaust at the stoichiometric air/fuel ratio becomes constant, which, according to the same way of thinking as in the case of Equation (1) above, implies that $AFRT = AFST/(1 + (C_2/GA))$, where $C_2$ is a constant).

In other words, the rich target exhaust air/fuel ratio AFRT is set so that it approaches the stoichiometric air/fuel ratio AFST as the flow amount GA becomes larger. Furthermore, in steps 427-03 through 427-07, RMAX and RMIN, which respectively indicate the upper limit value and the lower limit value for AFRT, are set as follows: RMAX is set to an air/fuel ratio in the range in which oxygen is adequately emitted from the ceria, so that oxygen emission operation from the catalyst 5 occurs, while RMIN is set to the lower limit air/fuel ratio at which it is possible for the engine 1 to operate in a stable manner. It should be understood that RMAX and RMIN as well, just like LMAX and LMIN, are desirably determined by experiment using the actual internal combustion engine 1 and the actual catalyst 5.

The OSR and $\Delta OSR$ of the step 427-15 respectively denote an oxygen emission amount counter (an amount of oxygen which is emitted from the catalyst 5 each time the operation of FIG. 4 is performed), and an increment thereto. As previously described, in this embodiment of the present invention, in this case as well, the rich target exhaust air/fuel ratio AFRT is set so that $\Delta OSR$ is constant.

In steps 427-17 through 427-25, a decision is made as to whether or not the exhaust gas downstream of the catalyst 5 is inverted to the rich air/fuel ratio side, (OXS>OXR), and, if it is thus inverted, then, along with calculating the integrated value $\Sigma OSR$ of the oxygen emission amount counter OSR, the value of a rich air/fuel ratio measurement number of times counter M is counted up, just as in the case of the operation of FIG. 7.

Next, the decision as to the amount by which the catalyst 5 has deteriorated, which is performed using $\Sigma OSL$ and $\Sigma OSR$ which have been calculated by the operations of FIG. 6 and FIG. 7, will be explained. As previously described, in this embodiment, if in the step 403 of FIG. 4 the predetermined condition (the condition for completing measurement) holds, the deterioration decision of the step 431 is performed. Here, as the measurement completion condition of the step 403, there is employed the condition that both the value of the counter N which is counted up in the step 429-23 of FIG. 6, and the value of the counter M which is counted up in the step 427-23 of FIG. 7, have arrived at a predetermined value N1.

In other words, in this embodiment, the deterioration decision for the catalyst 5 is performed when the number of times that the oxygen absorption and the oxygen emission amount, which have been measured with a lean air/fuel ratio and with a rich air/fuel ratio respectively, have both arrived at the predetermined value N1. By performing the catalyst deterioration decision in the manner after alternating supply of a rich air/fuel ratio and a lean air/fuel ratio has been performed a sufficient number of times, it is possible to prevent the oxygen occlusion state of the catalyst 5, when starting the catalyst deterioration decision operation, from exerting any influence upon the result of the deterioration decision, so that it is possible to perform the catalyst deterioration decision with high accuracy.

Figure 8:
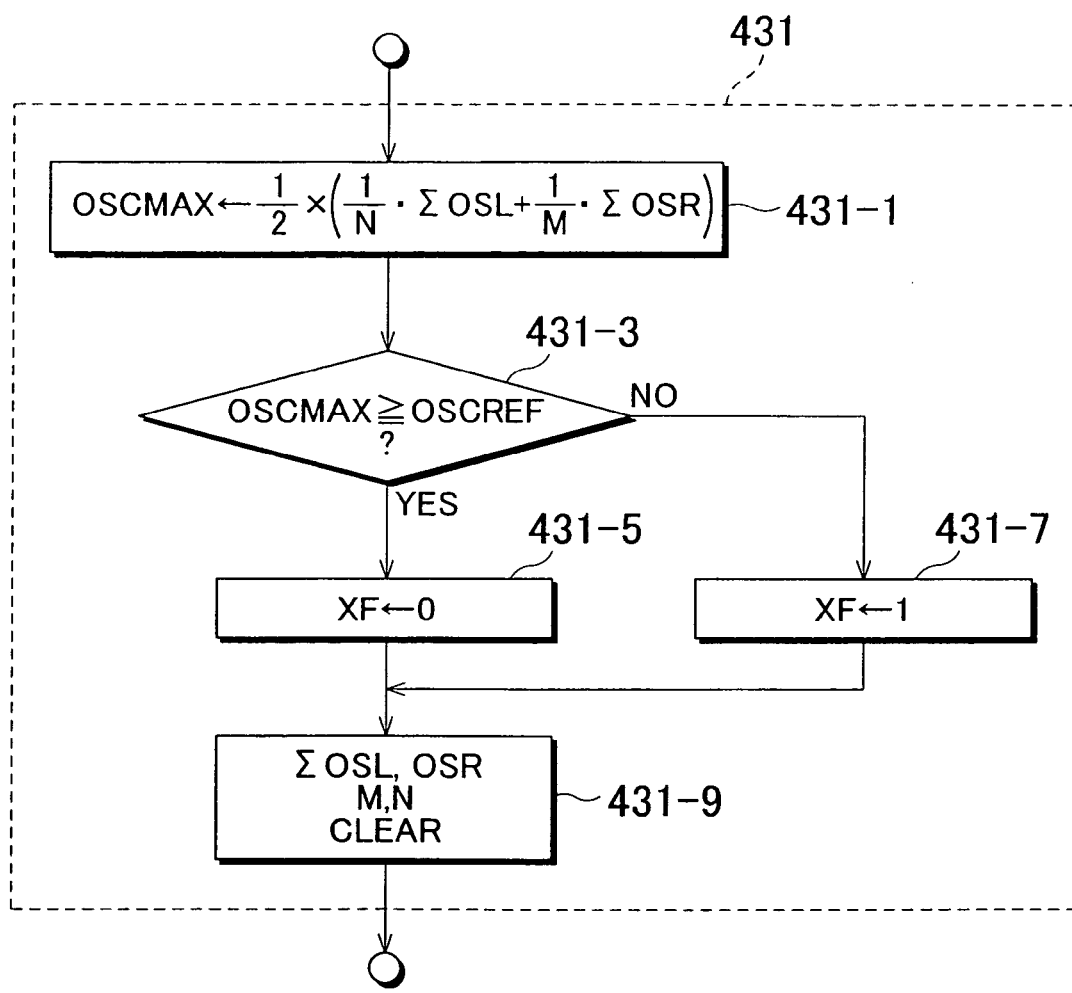
FIG. 8 is a flow chart for explanation of the details of a step for deciding whether or not the catalyst has deteriorated shown in FIG. 4.

FIG. 8 is a flow chart for explanation of the details performed in the step 431, for deciding upon whether or not the catalyst has deteriorated. FIG. 8 shows the calculation of the O2 storage amount OSCMAX for the deterioration decision of the step 431-1. In this embodiment, the oxygen occlusion amount average value $(1/N) \Sigma OSL$ for the lean air/fuel ratio control for one time is obtained from the total $\Sigma OSL$ oxygen amount occluded in the catalyst 5 by N times of lean air/fuel ratio control, and the average value $(1/2)((1/N) \Sigma OSL + (1/M) \Sigma OSR)$ of that value $(1/N) \Sigma OSL$ and of the oxygen emission amount average value $(1/M) \Sigma OSR$ for the rich air/fuel ratio control for one time obtained in the same manner is defined as OSCMAX. And, in a step 431-3, a decision is made as to whether or not the value OSCMAX obtained as described above is greater than or equal to a reference value OSCREF which is determined in advance.

If OSCMAX$\geq$OSCREF, then it is decided that the oxygen occlusion and emission capability of the catalyst 5 is sufficiently great and that its $O_2$ storage function is not much decreased, and, in a step 431-5, the value of a deterioration flag XF is set to 0. On the other hand, if in the step 431-5 OSCMAX<OSCREF, then it is decided that the oxygen occlusion and emission capability of the catalyst 5 has become low and that its $O_2$ storage function has decreased, so that, in a step 431-7, the value of the deterioration flag XF is set to 1.

When the value of the deterioration flag XF is set to 1 (the catalyst 5 has deteriorated), then, in this embodiment, an alarm lamp which is provided near the driver's seat of the vehicle is illuminated by a separate operation which is executed by the ECU 30, so that deterioration of the catalyst is notified to the driver of the vehicle.

After the end of the above described operation, in a step 431-9, the integrated counter values $\Sigma OSL$ and $\Sigma OSR$, and the counters M and N, are cleared, so that preparations for the decision as to catalyst deterioration next time are completed. It should be understood that, in the decision operation of FIG. 4, both the oxygen occlusion amount counter OSL of the catalyst 5 during lean air/fuel ratio control and the oxygen emission amount counter OSR of the catalyst 5 during rich air/fuel ratio control are measured, and the decision as to whether the catalyst has deteriorated is made based upon their average values; but it would also be possible to arrange to decide upon deterioration of the catalyst 5 using only one or the other of OSL or OSR, instead of using both OSL and OSR.

As described above, in this embodiment of the present invention, by arranging, according to the exhaust gas flow amount passing through the catalyst 5, for the air/fuel ratios of the lean air/fuel ratio exhaust and of the rich air/fuel ratio exhaust when making the decision as to deterioration of the catalyst both to approach closer to the stoichiometric air/fuel ratio, the larger is the exhaust gas flow amount, it becomes possible to perform the decision as to deterioration of the catalyst at high accuracy, irrespective of the flow amount of the exhaust.

What is claimed is:

1. A method for detecting deterioration of a catalyst, comprising steps of:
    alternately supplying exhaust gas of a lean air/fuel ratio and exhaust gas of a rich air/fuel ratio to the catalyst;
    varying the air/fuel ratio of the lean air/fuel ratio exhaust gas and the air/fuel ratio of the rich air/fuel ratio exhaust gas thus alternately supplied to the catalyst as a function of the exhaust gas flow amount supplied to the catalyst, wherein the air/fuel ratio of the supplied exhaust gas is brought closer to the stoichiometric air/fuel ratio when the exhaust gas flow amount supplied to the catalyst is great, as compared to when the exhaust gas flow amount supplied to the catalyst is small; and
    deciding upon the degree of deterioration of the catalyst, based upon at least one of the air/fuel ratio change time period from the initiation of supply of lean air/fuel ratio exhaust gas to the catalyst until the air/fuel ratio of the exhaust gas on the catalyst downstream side changes over to a lean air/fuel ratio, and the air/fuel ratio change time period from the initiation of supply of rich air/fuel ratio exhaust gas to the catalyst until the air/fuel ratio of the exhaust gas on the catalyst downstream side changes over to a rich air/fuel ratio,
    wherein the lean air/fuel ratio and the rich air/fuel ratio of the exhaust gas which flows into the catalyst are adjusted so that the length of the section of the catalyst over which oxygen is absorbed and emitted by the catalyst is kept substantially constant throughout the entirety of deciding upon the degree of deterioration.

2. The method for detecting deterioration of a catalyst according to claim 1, wherein,
    when deciding upon the degree of deterioration of the catalyst, the oxygen occlusion amount in the catalyst is estimated based upon the air/fuel ratio change time period, and the degree of deterioration of the catalyst is decided based upon the estimated oxygen occlusion amount,
    when alternately supplying exhaust gas of a lean air/fuel ratio and exhaust gas of a rich air/fuel ratio to the catalyst, the air/fuel ratios of the exhaust gas of a lean air/fuel ratio and the exhaust gas of a rich air/fuel ratio are set so that both the amount of the oxygen in the exhaust gas which is occluded into the catalyst per unit time during supply of exhaust gas of a lean air/fuel ratio, and the amount of the oxygen in the catalyst which is emitted into the exhaust gas per unit time during supply of exhaust gas of a rich air/fuel ratio, attain respective constant values, irrespective of the exhaust flow amount.

3. The method for detecting deterioration of a catalyst according to claim 1, wherein,
    when making the decision as to the degree of deterioration of the catalyst, the oxygen occlusion amount is estimated based upon the air/fuel ratio change time period, and the degree of deterioration of the catalyst is decided based upon the estimated oxygen occlusion amount,
    during the alternating supply of exhaust gas of the lean air/fuel ratio and exhaust gas of the rich air/fuel ratio, an air/fuel ratio lower limit value for the exhaust gas of the lean air/fuel ratio and an air/fuel ratio upper limit value for the exhaust gas of the rich air/fuel ratio are set within an air/fuel ratio range in which oxygen absorption and emission operation by the catalyst takes place.

4. The method for detecting deterioration of a catalyst according to claim 1, wherein the amounts of oxygen absorbed and emitted by the catalyst are calculated based upon the air/fuel ratio change time period, and the decision as to the degree of deterioration of the catalyst is performed after the number of times that the amounts of absorbed oxygen and emitted oxygen have been calculated for the lean air/fuel ratio and the rich air/fuel ratio each becomes greater than or equal to a predetermined number of times.

5. The method for detecting deterioration of a catalyst according to claim 1, wherein, after having started the alternating supply of exhaust gas of the lean air/fuel ratio and exhaust gas of the rich air/fuel ratio, after the initial supply of exhaust gas of the rich air/fuel ratio is completed, the decision as to the degree of deterioration of the catalyst based upon the air/fuel ratio change time period is initiated.

6. The method for detecting deterioration of a catalyst according to claim 5, wherein, during the alternating supply of exhaust gas of the lean air/fuel ratio and exhaust gas of the rich air/fuel ratio, the exhaust gas air/fuel ratio during the initial supply of exhaust gas of the rich air/fuel ratio is set to be lower than the exhaust gas air/fuel ratio during the second and subsequent supply of exhaust gas of the rich air/fuel ratio.

7. A device for detecting deterioration of a catalyst, comprising:
an exhaust air/fuel ratio control device which alternately supplies exhaust gas of a lean air/fuel ratio and exhaust gas of a rich air/fuel ratio to the catalyst, and varies the air/fuel ratio of the lean air/fuel ratio exhaust gas and the air/fuel ratio of the rich air/fuel ratio exhaust gas thus alternately supplied to the catalyst as a function of the exhaust gas flow amount supplied to the catalyst, wherein the air/fuel ratio of the supplied exhaust gas is brought closer to the stoichiometric air/fuel ratio when the exhaust gas flow amount supplied to the catalyst is great, as compared to when the exhaust gas flow amount supplied to the catalyst is small;
an air/fuel ratio change time period detection device which detects the air/fuel ratio change time period from the initiation of supply of lean air/fuel ratio exhaust gas to the catalyst until the air/fuel ratio of the exhaust gas on the catalyst downstream side changes over to a lean air/fuel ratio, or the air/fuel ratio change time period from the initiation of supply of rich air/fuel ratio exhaust gas to the catalyst until the air/fuel ratio of the exhaust gas on the catalyst downstream side changes over to a rich air/fuel ratio; and
a catalyst deterioration decision device which decides upon the degree of deterioration of the catalyst, based upon at least one of the air/fuel ratio change time period from the initiation of supply of lean air/fuel ratio exhaust gas to the catalyst until the air/fuel ratio of the exhaust gas on the catalyst downstream side changes over to a lean air/fuel ratio, or the air/fuel ratio change time period from the initiation of supply of rich air/fuel ratio exhaust gas to the catalyst until the air/fuel ratio of the exhaust gas on the catalyst downstream side changes over to a rich air/fuel ratio,
wherein the exhaust air/fuel ratio control device adjusts the lean air/fuel ratio and the rich air/fuel ratio of the exhaust gas which flows into the catalyst so that the length of the section of the catalyst over which oxygen is absorbed and emitted by the catalyst is kept substantially constant for the entirety of the deciding upon the degree of deterioration by the catalyst deterioration decision device.

8. The device for detecting deterioration of a catalyst according to claim 7, wherein
the catalyst deterioration decision device, when deciding upon the degree of deterioration of the catalyst, estimates the oxygen occlusion amount in the catalyst based upon the air/fuel ratio change time period, and decides the degree of deterioration of the catalyst based upon the estimated oxygen occlusion amount,
when alternately supplying exhaust gas of a lean air/fuel ratio and exhaust gas of a rich air/fuel ratio to the catalyst, the exhaust air/fuel ratio control device sets the air/fuel ratios of the exhaust gas of a lean air/fuel ratio and the exhaust gas of a rich air/fuel ratio so that both the amount of the oxygen in the exhaust gas which is occluded into the catalyst per unit time during supply of exhaust gas of a lean air/fuel ratio, and the amount of the oxygen in the catalyst which is emitted into the exhaust gas per unit time during supply of exhaust gas of a rich air/fuel ratio, attain respective constant values, irrespective of the exhaust flow amount.

9. The device for detecting deterioration of a catalyst according to claim 7, wherein
the catalyst deterioration decision device, when making the decision as to the degree of deterioration of the catalyst, estimates the oxygen occlusion amount based upon the air/fuel ratio change time period, and decides the degree of deterioration of the catalyst based upon the estimated oxygen occlusion amount, during the alternating supply of exhaust gas of the lean air/fuel ratio and exhaust gas of the rich air/fuel ratio, the exhaust air/fuel ratio control device sets an air/fuel ratio lower limit value for the exhaust gas of the lean air/fuel ratio and an air/fuel ratio upper limit value for the exhaust gas of the rich air/fuel ratio within an air/fuel ratio range in which oxygen absorption and emission operation by the catalyst takes place.

10. The device for detecting deterioration of a catalyst according to claim 7, wherein the catalyst deterioration decision device calculates the amounts of oxygen absorbed and emitted by the catalyst based upon the air/fuel ratio change time period, and performs the decision as to the degree of deterioration of the catalyst after the number of times that the amounts of absorbed oxygen and emitted oxygen have been calculated for the lean air/fuel ratio and the rich air/fuel ratio each becomes greater than or equal to a predetermined number of times.

11. The device for detecting deterioration of a catalyst according to claim 7, wherein, after having started the alternating supply of exhaust gas of the lean air/fuel ratio and exhaust gas of the rich air/fuel ratio, and after the initial supply of exhaust gas of the rich air/fuel ratio is completed, the exhaust air/fuel ratio control device initiates the decision as to the degree of deterioration of the catalyst based upon the air/fuel ratio change time period.

12. The device for detecting deterioration of a catalyst according to claim 11, wherein, during the alternating supply of exhaust gas of the lean air/fuel ratio and exhaust gas of the rich air/fuel ratio, the exhaust air/fuel ratio control device sets the exhaust gas air/fuel ratio during the initial supply of exhaust gas of the rich air/fuel ratio to be lower than the exhaust gas air/fuel ratio during the second and subsequent supply of exhaust gas of the rich air/fuel ratio.

13. A device for detecting deterioration of a catalyst, comprising:
exhaust air/fuel ratio control means which alternately supplies exhaust gas of a lean air/fuel ratio and exhaust gas of a rich air/fuel ratio to the catalyst, and varies the air/fuel ratio of the lean air/fuel ratio exhaust gas and the air/fuel ratio of the rich air/fuel ratio exhaust gas thus alternately supplied to the catalyst as a function of the exhaust gas flow amount supplied to the catalyst, wherein the air/fuel ratio of the supplied exhaust gas is brought closer to the stoichiometric air/fuel ratio when the exhaust gas flow amount supplied to the catalyst is great, as compared to when the exhaust gas flow amount supplied to the catalyst is small;
air/fuel ratio change time period detection means which detects the air/fuel ratio change time period from the initiation of supply of lean air/fuel ratio exhaust gas to the catalyst until the air/fuel ratio of the exhaust gas on the catalyst downstream side changes over to a lean air/fuel ratio, or the air/fuel ratio change time period from the initiation of supply of rich air/fuel ratio exhaust gas to the catalyst until the air/fuel ratio of the exhaust gas on the catalyst downstream side changes over to a rich air/fuel ratio; and catalyst deterioration decision means which decides upon the degree of deterioration of the catalyst, based upon at least one of the air/fuel ratio change time period from the initiation of supply of lean air/fuel ratio exhaust gas to the catalyst until the air/fuel ratio of the exhaust gas on the downstream side changes over to a lean air/fuel ratio, or the air/fuel ratio change time period from the initiation of supply of rich air/fuel ratio exhaust gas to the catalyst until the air/fuel ratio of the exhaust gas on the catalyst downstream side changes over to a rich air/fuel ratio,.

wherein the exhaust air/fuel ratio control means adjusts the lean air/fuel ratio and the rich air/fuel ratio of the exhaust gas which flows into the catalyst so that the length of the section of the catalyst over which oxygen is absorbed and emitted by the catalyst is kept substantially constant for the entirety of the deciding upon the degree of deterioration by the catalyst deterioration decision means.

* * * * *